P. C. INGERSOLL.
Seed-Planter.
No. 66,088. Patented June 25, 1867.
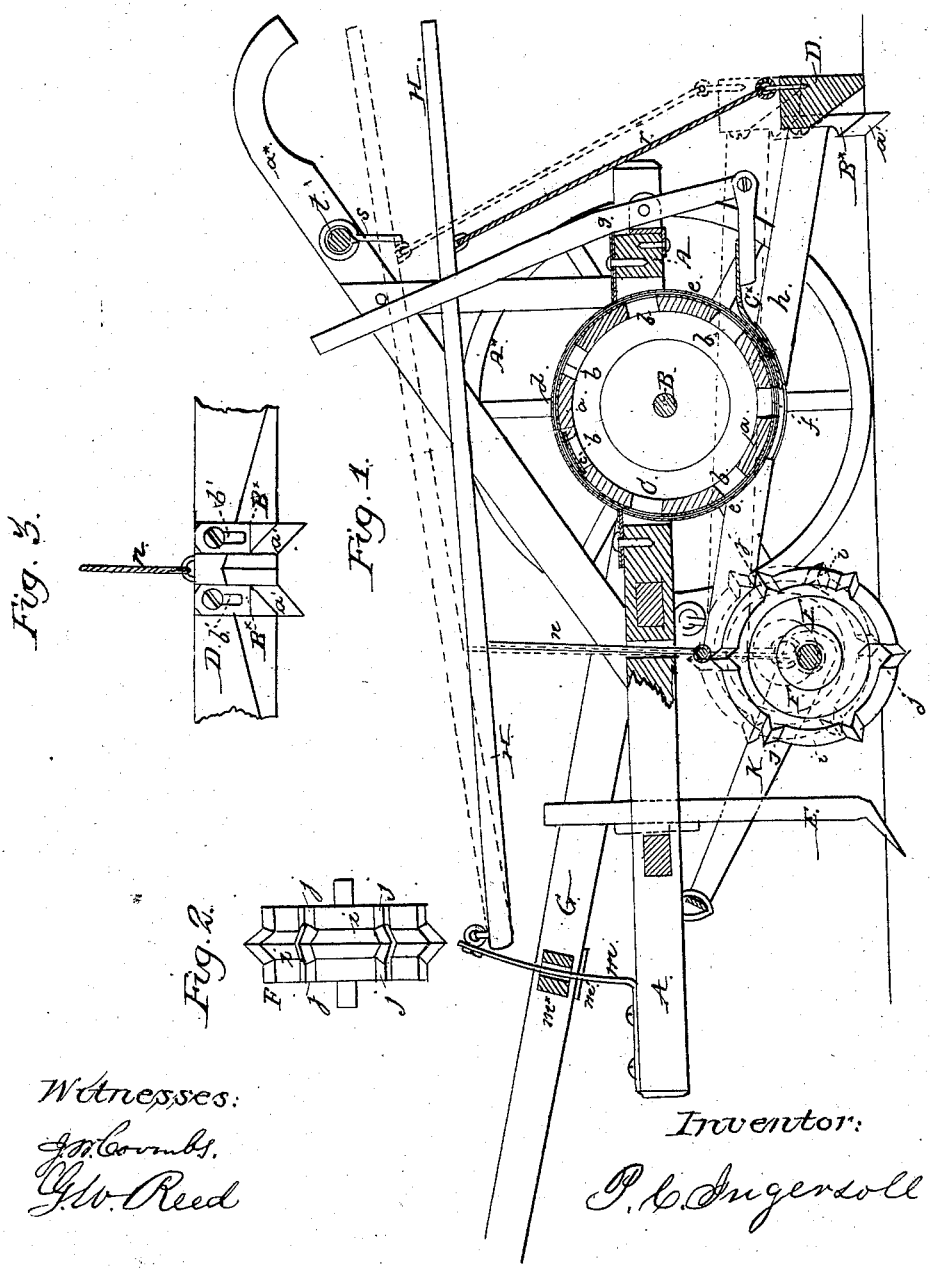

United States Patent Office.

P. C. INGERSOLL, OF GREENPOINT, NEW YORK, ASSIGNOR TO HIMSELF AND HORACE F. DOUGHERTY, OF SAME PLACE.

Letters Patent No. 66,088, dated June 25, 1867.

IMPROVEMENT IN SEEDING MACHINES.

The Schedule referred to in these Letters Patent and making part of the same.

TO ALL WHOM IT MAY CONCERN:

Be it known that I, P. C. INGERSOLL, of Greenpoint, in the county of Kings, and State of New York, have invented certain new and useful improvements in Seeding Machines; and I do hereby declare that the following is a full, clear, and exact description of the same, reference being had to the accompanying drawings, making a portion of this specification, in which—

Figure 1 is a central vertical longitudinal section of a seeding machine constructed according to my invention.

Figures 2 and 3 are detached front views of portions of the same.

Similar letters of reference indicate corresponding parts in all the figures.

This invention is designed more especially for planting cotton seed, but may also, when desired, be employed for planting seed and grain of various kinds.

The invention consists in the combination of a series of adjustable slides with a series of holes or openings formed in the circumference of a rotating hopper, whereby any suitable number of the said holes may be wholly closed to regulate the distances apart at which the seed is dropped into the furrow from the said hopper. The invention further consists in an adjustable sliding gate, so arranged in relation with the aforesaid rotating hopper, that the quantity of seed dropped at each revolution of such hopper may be regulated with great accuracy and convenience. The invention further consists in a lever, so combined with the sliding gate just mentioned, and the rotating hopper, that the person using the machine may adjust the said gate without stooping. The invention further consists in a furrowing-wheel of novel construction, whereby the furrowing of the ground for the reception of the seed is performed in a very superior manner. The invention further consists in a drag-bar, drawn in rear of the seed-dropping mechanism of the machine, and furnished with adjustable covering-shares of peculiar construction, whereby the seed are properly covered, and the ground left in a smooth condition after the passage of the machine. The invention further consists in the novel arrangement of parts whereby the furrowing-wheel and the drag-bar may be simultaneously lifted from the ground when desired to facilitate the turning of the machine.

To enable others to understand the nature and construction of my invention, I will proceed to describe it with reference to the drawings.

The horizontal frame A is supported at its rear end by the transverse axle B upon which are firmly secured the driving-wheels A*, and which is passed through the longitudinal axis of the barrel or bilge-shaped hopper C, which rotates with the axle, and is furnished with an opening provided with a suitable door or lid which may be opened to enable the seed to be introduced into the said hopper. Formed at the central or largest part of the aforesaid hopper, in a series extending around the circumference thereof, is any desired number of holes, $b$. This central part of the hopper may be strengthened by a perforated band, $a'$, underneath which are formed suitable guides for the reception of slides $c$, of which there is intended to be one to each of the holes $b$, and which may be moved over the said holes to entirely close any desired number thereof, in order to vary the distance apart of the seed dropped into the furrow, as will hereinafter fully appear. Attached to the frame A, and extending one over and the other underneath the hopper, are two semicircular straps $d$ $e$, which prevent the escape of the seed through the holes $b$, except when the said holes are brought into a position coincident with an opening, $f$, formed in the lowermost strap $e$. Situated upon the under side of this strap $e$ are guides, which receive a sliding gate C*, which, being moved in or out, as may be desired, to enlarge or diminish the size of the opening $f$, serves to regulate the quantity of seed dropped from the hopper in the operation of the machine. The rearmost end of this gate C* is connected with an upright lever, $g$, by means of which the person using the machine may operate the said gate, as just mentioned, without stooping or stopping the machine to reach the same. Two bars, $h$, are pivoted at their forward ends underneath the front portion of the frame A, and, extending back behind the rear extremity of the said frame, have secured to their rearmost ends a transverse drag-bar, D, which serves to smooth the surface of the ground after the covering of the seed, and which has secured to its forward side two covering-shares, B*, the faces $a'$ of which are inclined at an angle to each other, as shown more clearly in fig. 3, and which are constructed with vertical slots $b'$, through which are passed the screws that attach them to the aforesaid drag-bar, in such manner that the said covering-shares may be adjusted to penetrate into the ground to a greater or less depth, as circumstances may require. Situated at the centre of the front end of the frame A is a vertical furrowing-stock, E, and between this stock and the central or enlarged portion of the hopper is a furrowing-wheel, F, the periphery of which is formed with an outwardly projecting ridge or rib, $i$, which is of angular form, or, in other words, V-shaped in its cross-section, such shape being more clearly shown in fig. 2. Also formed upon the periphery of this furrowing-wheel is any number of transverse outwardly projecting spurs $j$. This furrowing-wheel is pivoted in the free end of a hanging frame, $k$, the forward end of which is pivoted under the forward extremity of the main frame A. The shafts G, by which the machine is drawn, are pivoted upon the outer extremities of the axle B, and are made adjustable at any desired angle to the main frame by means of a perforated bar, $m$, attached to the main frame, and projecting upward through a slot in the cross-bar $m^*$ of the aforesaid shafts, a pin, $m'$, being passed through one of the holes in the bar $m$ underneath the said cross-bar to sustain the shafts in position. Pivoted to the upper end of the bar $m$ is a lever, H, which extends back between the handles $a^*$ attached to the main frame A, and which is connected by a cord or chain, $n$, with the hanging frame $k$, and by another cord or chain, $r$, with the drag-bar D, in such manner that by raising the said lever the drag-bar and the furrowing-wheel may be simultaneously lifted from the ground, in order to facilitate turning the machine around, or the moving the same from place to place when not in active operation, the said drag-bar and furrowing-wheel being retained in such elevated position, when required, by simply hanging the free end of the lever H upon a hook, $s$, attached to the cross-rod $t$ of the handles, all as shown in red outline in fig. 1.

The hopper C being filled with seed, and the furrowing-wheels and drag-bar being let down upon the ground, as shown in fig. 1, the machine is drawn along, and the stock E cleans away obstructions, such as stones, sods, &c., before the furrowing-wheel F, and also forms a slight furrow, which is deepened by the circumferential angular ridge or rib $i$ of the furrowing-wheel, the transverse studs or spurs $j$ of which dig into and loosen the soil in the furrow thus formed, and thus better fit it for the reception of the seed. The rotation of the hopper causes the seed to be discharged therefrom through the hole $b$ thereof as the said holes are brought opposite to or coincident with the opening $f$, the size of which is regulated by the sliding gate $C^*$, as hereinbefore set forth; the seed dropping through the said opening into the furrow, whereupon the inclined faces $a'$ of the adjustable shares $B^*$ attached to the drag-bar D turn the soil inward into the furrow, thus covering the seed therein, the under side of the drag-bar smoothing the surface of the soil as it is drawn over the same. When it is desired that the seed should be dropped at equal distances apart in the furrow, the slides $e$ are entirely removed from the holes $b'$ in the hopper C; but when it is desired to drop the seed only at intervals, any suitable number of the said holes at regular intervals are closed by means of the aforesaid slides, so that the seed is dropped at greater distances apart, the quantity of seed dropped from each of the holes when brought opposite the opening $f$ being determined by the size of the said opening as adjusted by the sliding gate $C^*$, as hereinbefore explained. It should be mentioned, furthermore, that in sowing or planting cotton seed the movement communicated thereto by the rotation of the hopper tends to wrap the filaments of each kernel or seed closely around the same, so as to materially facilitate the separation of the said seeds as they are dropped during the operation of planting the same. Instead of allowing the furrowing-wheel to rotate as it is drawn along, the said wheel may be fixed with reference to the swinging frame to which it is attached, in which case it will act as a share to open the furrow as the machine is drawn forward during the seeding or planting operation.

What I claim as my invention, and desire to secure by Letters Patent, is—

1. The combination of the series of adjustable slides $e$ with the series of holes or openings $b$ formed in the circumference of the rotating hopper C, substantially as and for the purpose herein set forth.

2. The adjustable sliding gate $C^*$, arranged in relation with the rotating hopper C, substantially as and for the purpose specified.

3. The lever $g$, combined in relation with the sliding gate $C^*$ and rotating hopper C, substantially as and for the purpose specified.

4. The transverse spurs or projections $j$, arranged in relation with the angular circumferential rib $i$ of the furrowing-wheel F, substantially as and for the purpose specified.

5. The drag-bar D, arranged in rear of the seed-dropping mechanism, and furnished with covering-shares, constructed as described, substantially as and for the purpose specified.

6. The lever H and lifting-cords or chains $n$ $r$, arranged in relation with each other and with the furrowing-wheel and drag-bar, substantially as and for the purpose specified.

P. C. INGERSOLL.

Witnesses:
J. W. COOMBS,
G. W. REED.